United States Patent
Wintriss

[15] 3,656,139
[45] Apr. 11, 1972

[54] MALFUNCTION DETECTOR

[72] Inventor: George Victor Wintriss, San Diego, Calif.

[73] Assignee: Industrionics Controls Inc., New York, N.Y.

[22] Filed: Apr. 28, 1970

[21] Appl. No.: 32,702

[52] U.S. Cl. ............................340/267 R, 72/4, 307/112
[51] Int. Cl. ..................................................G08b 21/00
[58] Field of Search.......................340/267; 200/61.42; 72/4; 307/112

[56] References Cited

UNITED STATES PATENTS 3,319,087    5/1967    Wintriss..........................340/267 UX Primary Examiner—John W. Caldwell
Assistant Examiner—Michael Slobasky
Attorney—Schiller & Pandiscio

[57] ABSTRACT

A malfunction detector for automatically monitoring and controlling operation of a cyclically operating machine performing one or more operations on work pieces at one or more stations. The detector is of modular construction and includes a circuit for providing a monitoring check cycle and indications that the monitoring cycle has been completed without detecting any malfunctions or that the cycle has not been initiated. Circuitry is also provided for indicating at which individual station any malfunction occurs during the monitoring cycle and for indicating if such malfunction circuitry at any station has become inoperative. Circuitry is also provided for initiating either immediate stoppage of the machine or stoppage at the end of the machine cycle in progress depending on the type of malfunction if the machine is so adapted.

14 Claims, 3 Drawing Figures

G. VICTOR WINTRISS
INVENTOR.

BY
Schiller & Pandiscio
ATTORNEYS.

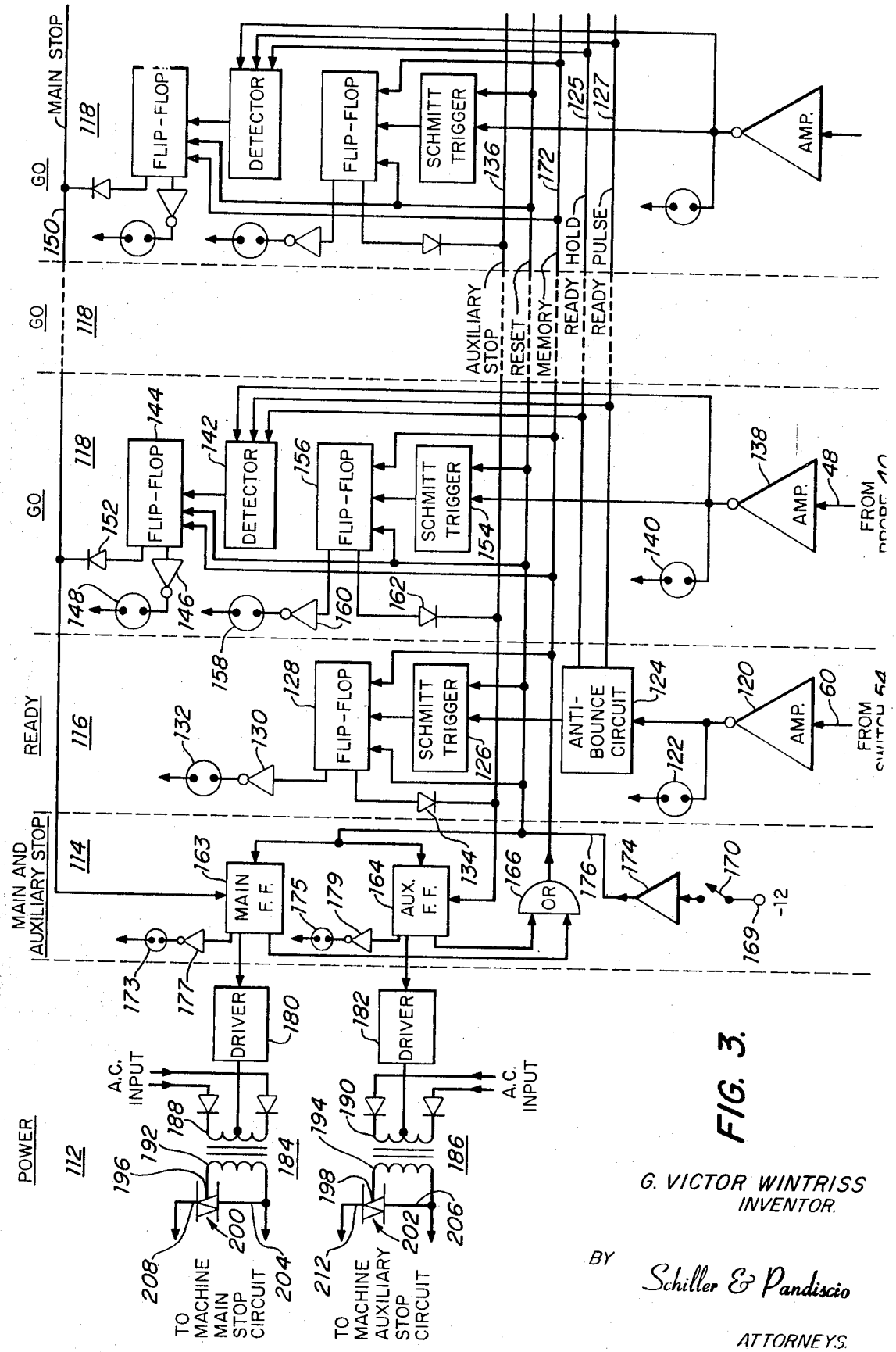

MALFUNCTION DETECTOR

This invention relates to apparatus for detecting malfunctions and more particularly to a malfunction detector for use with various types of machinery.

One serious problem in operating various types of presses or similar machinery having various reciprocal motions is the inability to quickly detect and locate any malfunctions which may occur at one or more work stations of the machine. Some attempts have been made to provide fault detectors but these have suffered from several drawbacks. One significant drawback in such systems is the inability to determine whether the machine itself is malfunctioning or that the detector has a malfunction. Another disadvantage of prior systems is that they are fixed systems having no flexible capability for accommodating different machines with a different number of stations to be monitored. Also, such systems do not necessarily indicate at exactly which stations the malfunction is occurring. Finally, these prior systems have a relatively unsophisticated and crude approach in initiating stoppage of the machine when a malfunction is detected.

The malfunction detector of the present invention overcomes these shortcomings and disadvantages of the prior art.

One object of this invention is to provide a new and improved malfunction detector for use with cyclically operating machines.

Another object is to provide a new and reliable malfunction detector which monitors, controls and completely automates the operation of cyclically operating machines of the type adapted to perform various reciprocal motions including, among others, pressworking, stamping, punching, die-cutting, drilling, grinding, etc.

A more specific object is to provide a new and improved malfunction detector for controlling operation of a cyclically operated machine by receiving signals from outside sensors and logically processing them together with internally generated logic signals.

A further specific object is to provide a malfunction detector which can not only detect the location of machine malfunctions but can also provide an indication when the detector itself is malfunctioning.

Another object of the present invention is to provide a malfunction detector which automatically initiates immediate stoppage of a cyclically operating machine when a machine malfunction is detected.

Still another object of the present invention is to provide a malfunction detector which automatically initiates stoppage of a cyclically operating machine at the end of the cycle in progress when a detector probe malfunction is detected.

Yet another object of the present invention is to provide a malfunction detector o modular construction with front-panel module loading for use with cyclically operating machines wherein the detector can be adapted to a desired number of stations to be monitored and controlled.

Another object of the present invention is to provide a malfunction detector that provides a visual indication to the machine operator of the instantaneous state of the machine at all times including the location of any detected machine malfunction and the failure or malfunctioning of the detector itself.

Yet another object of the present invention is to provide a malfunction detector which makes use of some solid state, integrated circuitry and is designed for maximum reliability including the printed circuit board connections, filtering of each input for high noise rejection, protection from contact bounce and protection of each module from accidental high voltages.

The foregoing objects and other objects disclosed or rendered obvious in this specification are attained by providing apparatus for automatically monitoring and controlling operation of a cyclically operating machine performing one or more operations on work pieces at one or more stations, the apparatus comprising means for initiating a predetermined cycle during which all the operations at the stations are simultaneously monitored; means for indicating completion of a monitoring cycle with all stations operating and continuing to run without any malfunctions; means for indicating that the predetermined monitoring cycle has not been properly initiated; means for indicating the station locations of any machine malfunctions which occur during the predetermined monitoring cycle; means for indicating that the means for indicating a particular station's malfunctioning has become inoperative; and means for initiating stoppage of the machine when any one of the above malfunction indicating means gives a malfunction indication.

Further details and other advantages of the invention are provided by the following description which is to be considered together with the accompanying drawing wherein:

FIG. 3 is a block diagram of a preferred embodiment of a malfunction detector constructed according to this invention and used with the machine of FIG. 1.

Figure 1:
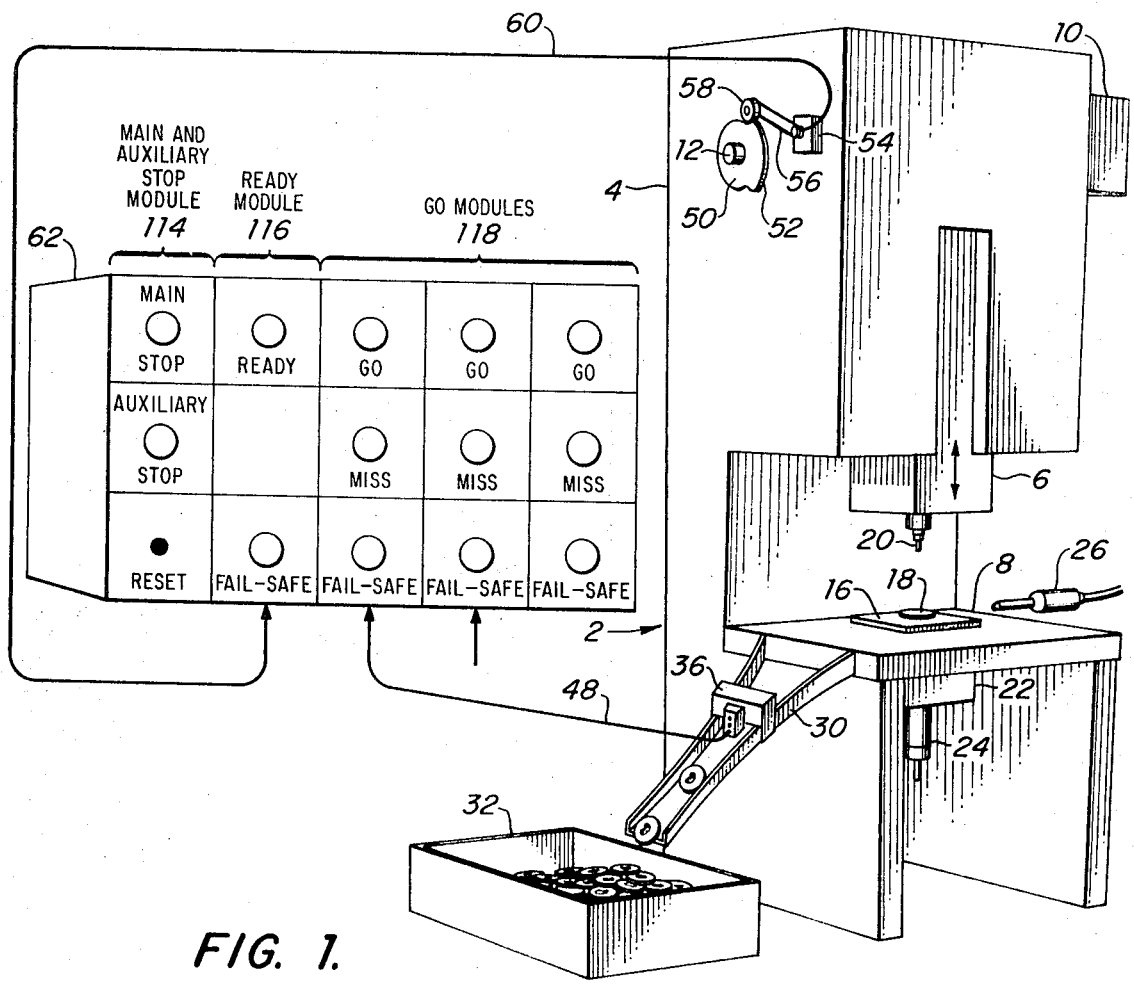
FIG. 1 is a perspective view of a machine embodying the present invention.

Turning now to FIG. 1, there is shown a machine or press 2 having a frame 4 which carries a ram 6 that is mounted to move down and up with respect to a bed 8 in response to operation of an electrical motor 10 which drives the ram through a shaft 12 rotatably mounted to frame 4 and conventional intermediate drive mechanism (now shown). Such intermediate mechanism is not shown since it forms no part of the present invention and is well known in the art of presses. In the usual case, shaft 12 is connected to motor 10 by way of a clutch (not shown) and such intermediate mechanism includes an eccentric mounted on shaft 12 and connected to the ram through a connecting rod so that the ram is operated through one complete down and up cycle for each revolution of shaft 12. Bed 8 carries guide 16 adapted to support a workpiece 18. The ram 6 carries a tool 20 designed to operated on a workpiece supported by guide 16. The machine also includes means for stripping a finished workpiece from the guide 16. Such stripping means are shown schematically at 22 since it forms no part of the invention. The work-stripper typically comprises a pneumatic or hydraulic actuater 24 which is adapted to raise an ejection pin or pins (not shown) for stripping the workpiece from the guide 16. Discharge of the stripped workpiece is achieved by means of a jet of air delivered on command by an air nozzle 26. The discharged parts fall onto a metal chute 30 which forms an integral electrical connection with the frame 4 and which delivers them to a collecting receptacle 32.

Figure 2:
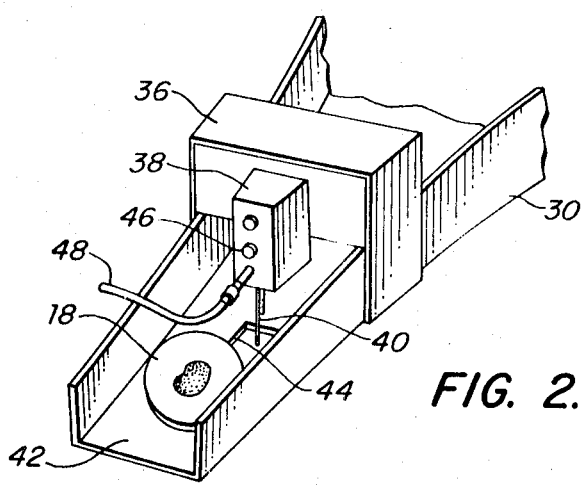
FIG. 2 is a perspective view on an enlarged scale of a portion of the machine of FIG. 1.

In accordance with this invention, the press is provided with means for detecting machine malfunctions as hereinafter described. In this connection as seen in FIG. 2 the chute 30 is provided with a bracket 36 on which is mounted a connector block 38 insulated from the press frame carrying a resilient electrically conductive probe 40 that extends down to the level of the floor 42 of the chute. The floor 42 is provided with a hole 44 located so that the probe cannot touch the floor. The connector has one or more terminals 46 which are coupled internally of the connector to the probe 40. In the illustrated case, one of the terminals 46 is fitted with a connecting cable 48 which is insulated from the press frame for coupling the probe to the malfunction detector. The chute is dimensioned so that each finished part discharged from guide 16 must encounter and deflect the probe 40 before falling into the receptacle 32. Each time the probe is encountered by a finished part, it is effectively electrically connected by the part to the chute which is at ground potential. Hence the probe and chute together comprise switch means. As an alternative measure, the connector block 38 could be replaced by a normally open switch with an actuating arm that is positioned like probe 40 so that the switch is closed each time and for so long as its actuating arm is displaced or deflected by a workpiece on the chute.

Further in accordance with this invention, the shaft 12 is fitted with a cam 50 having a lobe 52 whose periphery extends over a predetermined angle. Mounted on the frame is a switch 54 having a pivotal operating arm 56 carrying a roller 58 that rides on the periphery of the cam. Switch 54 is hereinafter termed the shuttle switch since its operation is according to the up and down or shuttle movement of ram 6. The switch 54 is normally open but closes when the roller 58 is engaged by the lobe on cam 50, the lobe acting to cam arm 56 in a direction to close the switch. The switch is coupled to the malfunction detector by a suitable insulated connecting cable 60. As an alternative measure, switch 54 and arm 56 could be replaced by probe 40 with the probe disposed to contact only the lobe of cam 50. Hence the probe would provide a ground connection by way of cam 50 only during the period that it is engaged by lobe 52.

Although the present invention is being described for use in conjunction with the press 2, it should be understood that the malfunction detector could be used with any number of different machines performing various work operations. The terms "operations" or "work operations" as used herein refer to the various operations which may be performed by the machine and includes, among other things, such motions or activities as feeding, ejecting, stamping, transporting, inspecting, counting, cleaning etc., of the work pieces as well as such things as process temperature control, process sensitivity to such extraneous elements as water, chemicals, etc. It should be clear that the term "operations" is used in a very broad sense to cover a wide variety of machine monitoring operations and operations on workpieces.

In the specific press 2 described, the workpieces must be electrically conductive in order that probe 40 and any other such probes used with the press may be properly actuated. However, machines operating on non-electrically conductive materials may also be used with the malfunction detector of the present invention. Non-electrically conductive work pieces would utilize different types of probes from those described in conjunction with press 2, such as for example, fiber optic probes, airswitch probes, fluidic type probes, work piece overload type probes, sonic detector type probes, etc.

In this preferred embodiment, the remainder of the malfunction detector is mounted within a case 62, which may or may not be attached to the frame of the press. The front panel of case 62 is made up of a number of plug-in modules each having indicator lights which serve to display the status of the operation of the machine and the malfunction detector as will be hereafter described. Case 62 has terminals for connecting a power cable (not shown). Cables 48 and 60 are shown functionally connected to the appropriate plug-in modules of the malfunction detector.

Turning now to FIG. 3, the malfunction detector circuitry mounted with the case 62 comprises several modular units labelled power module 112, main and auxiliary stop module 114, ready module 116, and go modules 118, each separated by the vertical dashed lines. Each of the modules are independent plug-in units mounted on separate printed circuit boards with individual front panels and respective components. Each of these modules will now be described and then the total operation of the detector will be described. These modules are front-loaded in the front face of the case 62 of the detector as shown in FIG. 1, and are easily replaced in a matter of seconds.

The ready module 116 monitors a predetermined checking or monitoring cycle during which malfunctions in the machine may be detected and visually displayed to the machine operator. The ready module includes means for indicating proper initiation of the checking cycle by a ready indication and a ready failsafe indication when information is received that the machine has stopped or the ready information becomes static. If the ready indication is on or absent continuously for a predetermined time interval, a signal is initiated to stop the operation of the machine and at the same time provide a ready failsafe indication.

The ready module 116 receives an input signal from the switch 54 on line 60 to generate a checking cycle which lasts during the time that the switch 54 closes when the roller 58 is engaged by the lobe 52 on cam 50. The incoming signal from switch 54 is filtered by a filtering amplifier 120 to substantially eliminate any undesired noise. The filtered signal is applied to a ready lamp 122 located on the front panel of ready module 116 which when lit indicates that the switch 54 has closed and a checking cycle has been initiated. The filtered output signal is also applied to an anti-bounce circuit 124 which ignores any contact bounce which might create ambiguities when the switch 54 closes. Anti-bounce circuits are well known in the art and one such circuit which may be used with the present invention is described in an article in "Electronics Circuit Designers Casebook," No. 14–7, McGraw Hill, 1969 Edition.

The output from the anti-bounce circuit 124 should be applied to the go modules 118 on lines 125 and 127 and to a Schmitt trigger 126 which is set to trigger after a predetermined continuous time interval. If during this time interval the signal from circuit 124 is either on continuously or absent, then Schmitt rigger 126 fires. The time interval may be adjustable over a range, such as for example, from a few seconds up to a minute or more depending on the characteristics of the particular machine with which the detector is being used. If the signal from the circuit 124 is present or absent for the predetermined time interval, the Schmitt trigger fires to change the state of a bistable circuit shown as flip-flop 128. The change of state of flip-flop 128 is fed to an amplifier 130 which drives a lamp 132 labeled failsafe on the front panel of ready module 116 which indicates the improper operation or lack of the checking cycle. The change of state of the flip-flop 128 is also coupled through a diode 134 to the stop module 114 via auxiliary stop line 136.

The go modules 118 are used to detect machine malfunctions at various work stations of the machine. The number of go modules may be varied according to the number of stations or operations to be monitored. For example, if three operations were to be monitored, three go modules would be used i.e., one go module for each operation being monitored. For purposes of this description assume that the only station being monitored is by probe 40 whose output signal is fed on cable 48 to the go module 118 immediately adjacent to the ready module 116. However probe 40 could be connected to any one of the go modules 118. Each of the go modules 118 is identical. The signal on cable 48 is applied to a filtering amplifier 138. The output from amplifier 138 drives a lamp 140 on the front panel of the go module 118, which when lit indicates that the station has received a completed inspection signal without any malfunctions in the cyclical operation of the machine at that station.

The output of the amplifier 138 is also applied to a detector 142. Also connected to the detector 142 from lines 125 and 127 from the anti-bounce circuit 124 are ready hold and ready pulse signals. If the detector 142 does not detect a completed inspection signal from the station during the checking cycle, the detector 142 causes a bistable circuit shown as a flip-flop 144 to change its state. The change of state of flip-flop 144 is applied to an amplifier 146 which drives a lamp 148 on the front panel of go module 118. When lamp 148 is lit it indicates that the machine work station which it is monitoring is malfunctioning. The change of state of flip-flop 144 also causes initiation of a signal which is connected to stopmodule 114 on a main stop line 150 via a diode 152.

The filtered signal from amplifier 138 is also applied to a Schmitt trigger 154 which is set to trigger after a predetermined time interval after the input from probe 40 on line 48 has become shorted or opens. This time interval may be varied and in the particular embodiment of the invention is set to trigger approximately 8 seconds after the short or open occurs. The output from the trigger 154 causes the state of a bistable circuit shown as a flip-flop 156 to change, thereby lighting a lamp 158 on the front panel of module 118 via a driving amplifier 160. The output from the flip-flop 156 when it changes state is also applied to the main and auxiliary stop module 114 on line 136 via a diode 162.

The main and auxiliary stop module 114 is comprised of a main flipeflop 163, an auxiliary flip-flop 164, a memory line driver made up of an OR gate 166, and a reset switch 170. The flip-flop 163 receives its input signals from each of the flip-flops 144 via diodes 152 of the go modules 118 via the main stop line 150. The flip-flop 164 receives its input signals from flip-flop 128 via diode 134 of the ready module 116 and from each of the flip-flops 156 via the diodes 162 of the go modules 118 on the auxiliary stop line 136. The outputs from each of the flip-flops 163 and 164 are applied to the power module 112 and to a memory line driver made up of an OR gate 166. If the OR gate 166 receives an input from either flip-flop 163 or 164, a signal is applied on a memory line 172 to inhibit the flip-flop 128 of ready module 116 and to inhibit each of the flip-flops 144 and 156 of the go modules 118. Reset switch 170 which appears as a reset button on the front panel of module 114 has one terminal connected to an internal power supply. When the switch 170 is closed for a predetermined time, which in the preferred embodiment is one second, a gate 174 opens to allow the resetting of flip-flops 163 and 164, flip-flop 128 of ready module 116 and flip-flops 144 and 156 of each of the go modules 118 via a reset line 176. The signal on reset line 176 is also applied to the Schmitt trigger 126 of ready module 116 and to triggers 154 of of go modules 118 to start the timing circuits for the operation of these triggers. The flip-flops 163 and 164, when activated to change state, drive lamps 173 and 175 via amplifiers 177 and 179 respectively on the front panel of module 114 to indicate that they have changed state to initiate stoppage of the machine.

The power module 112 serves to provide the necessary power for the switching of the load power to provide two independent output circuits for ON-OFF control of the machine. The power module includes a pair of driving circuits 180 and 182 which derive their inputs from the man and auxiliary stop module 114. Driving circuits 180 and 182 may be any one of a number of well known such circuits in the art. An output from flip-flop 163 is connected to driving circuit 180 while an output from flip-flop 164 is connected to driving circuit 182. The outputs of each of the driving circuits 180 and 182 are connected to the center taps of primary windings 188 and 190 of isolation transformers 184 and 186 respectively. The driving circuits 180 and 182 apply DC levels to the center taps of primary windings 188 and 190 respectively. A.C. input signals from the system's power supply (not shown) are supplied via diodes 192 to both end terminals of the primary windings 188 and 190.

Secondary windings 192 and 194 of transformers 184 and 186 respectively each have one terminal connected to gate electrodes 196 and 198 of triacs 200 and 202. Terminal 204 of triac 200 is connected to the other terminal of secondary winding 192, and to a terminal of a shut off solenoid or relay (now shown) in the machine. The other terminal 208 of triac 200 is connected to a terminal of the shut off solenoid or relay. Terminal 206 of triac 202 is connected to the terminal of secondary winding 194 opposite the terminal to which gate electrode 198 is connected and to a terminal of another shut off solenoid or relay (not shown) in the machine if it is so adapted. Terminal 212 of triac 202 is connected to a shut off solenoid or relay (not shown) in the machine. The triacs 200 and 202 act as A.C. switches to provide the output signals for stopping cyclical operation of the machine being monitored and controlled. The triacs 200 and 202 are isolated from the A.C. input signals to transformers 184 and 186 respectively as well as all the other circuitry in power module 112.

The operation of the malfunction detector system, depicted in FIG. 3 will now be described. As the machine 2 performs its cyclical operations at its various work stations, the malfunction detector monitors and controls the operation. The ready module 116 receives a signal from switch 54 on line 60 which is applied to filtering amplifier 120. This signal lasts during the time that switch 54 closes when roller 58 is engaged by lobe 52 on cam 50 to provide the checking cycle. Lamp 122 lights to indicate the initiation and continuous existence of the checking cycle. The filtered signal from amplifier 120 is also applied to Schmitt trigger 126 via anti-bounce circuit 124. If the lamp 122 stays lit for the predetermined time interval for triggering Schmitt trigger 154, the trigger fires to change the state of flip-flop 128. The change of state of flip-flop 128 causes lamp 132 to be lighted indicating that the checking cycle has not been properly completed. The change of state of flip-flop 128 also causes auxiliary flip-flop 164 to change state, thereby causing driver 182 to apply a signal at D.C. level to the center tap of primary winding 190 of transformer 186. This induces a voltage in the secondary winding 194 which actuates triac 202.

Assuming that probe 40 is the only work station being monitored in the machine of FIG. 1, the signal from probe 40 is fed on line 48 to filtering amplifier 138. If lamp 140 is lighted at any time during the checking cycle, it indicates that the checking cycle at that station has been completed and that no malfunctions have occurred in the monitoring operation of probe 40. When the anti-bounce circuit receives the checking cycle signal, it provides outputs on ready hold line 125 and on ready pulse line 127. The signal on line 125 is a ready hold signal which beings at the beginning of the checking cycle and is applied to detector 142 to establish a predetermined logic state for detector 142. When a ready pulse occurs on line 127, it causes detector 142 to change state. If a signal is received by amplifier 138 indicating the proper operation of probe 40, the detector changes back to its original state and no output is applied from detector 142 to flip-flop 144. When, however, detector 142 is set by the ready pulse on line 127, if a signal is not received by amplifier 138 from probe 40 to reset it, the end of the ready hold signal on line 125 at the end of the checking cycle results in an output from detector 142 being applied to change the state of flip-flop 144. This change of state of flip-flop 144 lights lamp 148 indicating that the signal from probe 40 has been missed and simultaneously triggers via line 150 the main flip-flop 163 in stop module 114. The change in state of flip-flop 163 causes driver 180 to apply a signal at D.C. level to the center tap of primary winding 188 of transformer 184. This induces a voltage in the secondary winding 192 which actuates triac 202.

If the input signal from probe 40 persists beyond a predetermined time interval because the operation of probe 40 has become shorted, Schmitt trigger 154 is triggered thereby changing the state of flip-flop 156 which causes lamp 158 to be lighted. At the same time the change of state of flip-flop 156 applies a signal via diode 162 and line 136 to auxiliary stop flip-flop 164. Flip-flop 164 changes state initiating driver 182 to apply a signal at D.C. level to the center tap of primary winding 190 of transformer 186. The induces a voltage in the secondary winding 194 which actuates triac 202.

Depending on the particular machine being monitored and controlled and whether the machine is adapted with both an emergency stop and a stop at the top of the cycle, the power module 112 has six possible modes of operation which will now be described. In the art, generally the term "emergency" stop refers to an immediate stoppage or shut off of the machine whereas a "top" stop refers to the machine continuing its operation until the end of the cycle in progress has been completed before it comes to a stop or shuts off. In one mode of operation with both triacs 200 and 202 connected independently and triac 200 connected to the emergency stop circuit and triac 202 connected to the top stop circuit of the machine, both triacs are normally conducting. When either the main or auxiliary flip-flops 163 and 164 respectively changes state, the corresponding triac 200 and 202 is turned off, thereby actuating the corresponding stop circuit connected to triac 200 or 202 to either immediately stop the machine or to stop it when ram 6 reaches the top of its up-down reciprocal movement.

In a second mode of operation with both triacs connected independently to their respective stop circuits, both triacs are normally not conducting and a change of state of one of their corresponding flip-flops 163 and 164 will turn on the corresponding triac, thereby actuating the corresponding stop circuit. A third mode of operation has triac 200 normally conducting and triac 202 normally not conducting. A change of state of main flip-flop 163 will turn off triac 200, thereby actuating its corresponding stop circuit. A change of state of auxiliary flip-flop 164 will turn on triac 202, thereby actuating its corresponding stop circuit. In a fourth mode triac 200 is normally not conducting and triac 202 is normally conducting. A change of state of main flip-flop 163 will turn on triac 200, thereby actuating its corresponding stop circuit. A change of state of auxiliary flip-flop 164 will turn off triac 202, thereby actuating its corresponding stop circuit.

In the event the machine being monitored and controlled is not adapted for both a main and auxiliary stop, then triacs 200 and 202 may be wired in series or in parallel. If they are wired in series, both triacs are normally conducting and a change of state of either flip-flop 163 or 164 will turn off the corresponding triac, thereby actuating immediate stoppage of the machine. If the triacs are wired in parallel, both triacs are normally not conducting and a change of state of either flip-flop 163 or 164 will turn on the corresponding triac, thereby actuating immediate stoppage of the machine. The operation of the triacs depends on the manner of operation and arrangement of the driving circuits 180 and 182.

It should be understood that although only one operation of the machine monitored by one go module 118 was described, a plurality of go modules 118 could be employed, each monitoring and controlling a different work station and each operating to indicate either a completed checking cycle with no malfunctions as indicated by the lighting of lamp 140, a malfunction of the work station, such as a jammed workpiece, as indicating by the lighting of lamp 148, or a short or open in the monitoring signal at a particular station as indicated by the lighting of lamp 158. As many go modules 118 could be added as there were work stations to be monitored and controlled.

After each monitoring cycle in which either the main flip-flop 163 or auxiliary flip-flop 164 has been activated to initiate machine stoppage, the change of state of either flip-flop 163 or 164 causes OR gate 166 to apply an inhibiting signal on memory line 172 to prevent any of the flip-flops 128, 156 or 144 changing state. The flip-flops 128, 156, 144, 163 and 164 may all be reset by closing of reset switch 170 which applies the voltage at terminal 169 through amplifier 174 to all these elements via line 176. Closing of switch 174 also resets the timing circuits of Schmitt triggers 126 and 154.

Although not shown it is also possible to provide an optional feature which provides a test receptacle on the front panel of module 112 to permit plugging in of an optional module to test the operation of the detector or by-pass functionally the detector. It is also possible to provide external auxiliary control inputs mainly associated with material or workpiece "feed" monitoring which would activate the auxiliary stop flip-flop 164.

What is claimed is:

1. Apparatus for automatically monitoring and controlling operation of a cyclically operating machine that performs one or more operations at one or more stations, said apparatus comprising:

a first signal monitoring circuit for monitoring a machine cycle signal generated in response to each cycle of operation of said machine, a second signal monitoring circuit for monitoring a station operation signal generated in response to an operation at one of said stations, a third circuit for producing output signals in response to signals produced by said first and second signal monitoring circuits, and machine control circuit means adapted to be operated by the output signals of said third circuit;

said first circuit comprising means responsive to said machine cycle signal for producing a first signal pulse if said machine cycle signal is present or absent continuously for a predetermined time interval, additional means for producing second and third signal pulses in response to said machine cycle signal, and a first flip-flop adapted to reverse its state in response to said first signal pulse;

said second circuit comprising means responsive to said station operation signal for producing a fourth signal pulse if said station operation signal is present or absent continuously for a second predetermined time interval, detector means responsive to said second and third signal pulses and said station operation signal for producing a fifth signal if said station operation signal does not occur during the time duration of said third signal pulse, a second flip-flop adapted to reverse its state in response to said fourth signal pulse, and a third flip-flop adapted to reverse its state in response to said fifth signal;

said third circuit comprising means for producing a sixth output signal in response to a change of state of one of said first and second flip-flops resulting from said first and fourth signals respectively and means for producing a seventh output signal in response to a change of state of said third flip-flop resulting from said fifth signal; and said machine control circuit means comprising switch means for actuating means for stopping said machine in response to at least one of said sixth and seventh output signals.

2. Apparatus according to claim 1 further including means for resetting said flip-flops.

3. Apparatus according to claim 1 wherein said detector means is adapted to prevent production of said fifth signal if said station operation signal occurs during the time duration of said third pulse.

4. Apparatus according to claim 3 wherein said detector means is adapted to be set to a first logic state by said second pulse and is adapted to be reset to a second logic state by said station operation signal, and further wherein said detector means is adapted to produce said fifth signal at the end of said third pulse only if it is in said first logic state.

5. Apparatus according to claim 1 wherein said first signal monitoring circuit comprises a first indicator operative in response to said machine cycle signal to indicate initiation of a monitoring cycle, and a second indicator connected to said first flip flop and operative when said first flip-flop changes state in response to said first signal pulse to indicate that a monitoring cycle has not been properly initiated.

6. Apparatus according to claim 1 wherein said second signal processing circuit comprises a first indicator operative in response to said station operation signal to indicate the presence of a station operation signal, a second indicator connected to said second flip-flop and operative when said second flip-flop changes state in response to said fourth signal to indicate that the means for generating said station operation signal is malfunctioning, and a third indicator connected to said third flip-flop and operative when said third flip-flop changes state in response to said fifth signal to indicate that a station operation signal was not received during the time duration of said third signal pulse.

7. Apparatus according to claim 1 further including means operative on occurrence of one of said sixth and seventh output signals to inhibit said first, second, and third flip-flops.

8. Apparatus according to claim 1 wherein said third circuit comprises fourth and fifth flip-flops, said fourth flip-flop being adapted to change its state and produce said sixth signal in response to said change of state of one of said first and second flip-flops and said fifth flip-flop being adapted to change its state and produce said seventh signal in response to said change of state of said third flip-flop.

9. Apparatus according to claim 8 further including means for resetting said flip-flops.

10. Apparatus according to claim 8 further including an indicator coupled to each of said fourth and fifth flip-flops for indicating production of said sixth and seventh output signals.

11. Apparatus according to claim 1 wherein said machine control circuit means comprises first and second switch means connected for operation in response to said sixth and seventh output signals respectively.

12. Apparatus according to claim 1 wherein the said switch means is an A.C. switch and said machine control circuit means comprises transformer means for operating said A.C. switch in response to one of said sixth and seventh output signals.

13. Apparatus according to claim 1 wherein said switch means comprises first and second A.C. switches and said machine control circuit means comprises transformer means for operating said first and second switches in response to said sixth and seventh output signals respectively.

14. Apparatus for automatically monitoring and controlling operation of a cyclically operating machine that performs one or more operations at one or more stations, said apparatus comprising:
- a first signal monitoring circuit for monitoring a machine cycle of said machine, at least two second signal monitoring circuits for monitoring separate station operation signals generated in response to operations at at least two of said stations, a third circuit for producing output signals in response to signals produced by said first and second signal processing circuits, and machine control circuit means adapted to be operated by the output signals of said third circuit;
- said first circuit comprising means responsive to said machine cycle signal for producing a first signal pulse if said machine cycle signal is present or absent continuously for a predetermined time interval, additional means for producing second and third signal pulses in response to said machine cycle signal, and a first flip-flop adapted to reverse its state and provide a fourth signal in response to said first signal pulse;
- each of said second circuits comprising means for producing a fifth signal pulse if said station operation signal is present or absent continuously for a second predetermined time interval, detector means responsive to said second and third signal pulses and said station operation signal for producing a sixth signal if said station operation signal does not occur during the time duration of said third signal pulse, a second flip-flop adapted to reverse its state and provide a seventh signal in response to said fourth signal pulse, and a third flip-flop adapted to reverse its state and provide an eighth signal in response to said sixth signal;
- said third circuit comprising means for producing a ninth output signal in response to said fourth or seventh signals and means for producing a tenth output signal in response to said eighth signal; and
- said machine control circuit means comprising switch means adapted to be actuated in response to said ninth and tenth output signals.

* * * * *